(12) United States Patent
Nagai et al.

(10) Patent No.: US 11,214,849 B2
(45) Date of Patent: Jan. 4, 2022

(54) METHOD FOR RECOVERING SCANDIUM (71) Applicant: SUMITOMO METAL MINING CO., LTD., Tokyo (JP)

(72) Inventors: Hidemasa Nagai, Niihama (JP); Keiji Kudo, Niihama (JP); Itsumi Matsuoka, Niihama (JP); Yoshitomo Ozaki, Niihama (JP); Hirofumi Shoji, Niihama (JP); Shin-ya Matsumoto, Niihama (JP); Tatsuya Higaki, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 775 days.

(21) Appl. No.: 16/077,821

(22) PCT Filed: Feb. 21, 2017

(86) PCT No.: PCT/JP2017/006327
§ 371 (c)(1),
(2) Date: Aug. 14, 2018

(87) PCT Pub. No.: WO2017/146034
PCT Pub. Date: Aug. 31, 2017

(65) Prior Publication Data
US 2021/0254193 A1 Aug. 19, 2021

(30) Foreign Application Priority Data

Feb. 23, 2016 (JP) ............................. JP2016-032039

(51) Int. Cl.
C22B 59/00 (2006.01)
C01F 17/212 (2020.01)
C01F 17/17 (2020.01)
C01F 17/13 (2020.01)
C22B 3/26 (2006.01)
C01G 53/11 (2006.01)
C22B 3/08 (2006.01)
C22B 3/42 (2006.01)

(52) U.S. Cl.
CPC ............. *C22B 59/00* (2013.01); *C01F 17/13* (2020.01); *C01F 17/17* (2020.01); *C01F 17/212* (2020.01); *C01G 53/11* (2013.01); *C22B 3/08* (2013.01); *C22B 3/26* (2021.05); *C22B 3/42* (2013.01)

(58) Field of Classification Search
CPC .. C22B 59/00; C22B 3/26; C22B 3/08; C22B 3/42; C01F 17/212; C01F 17/17; C01F 17/13; C01G 53/11
See application file for complete search history.

(56) References Cited

U.S. PATENT DOCUMENTS 4,816,233 A 3/1989 Rourke et al.
7,282,187 B1 10/2007 Brown et al.
9,399,804 B2 * 7/2016 Ozaki ........................ C22B 3/22
9,963,762 B2 * 5/2018 Higaki ....................... C22B 3/08
10,081,851 B2 * 9/2018 Matsuoka ................. C22B 3/42
2012/0204680 A1 8/2012 Duyvesteyn
2013/0074653 A1 3/2013 Kobayashi et al.
2014/0314639 A1 10/2014 Mihaylov et al.
2015/0184268 A1 7/2015 Asano
2016/0047014 A1 2/2016 Ozaki et al.
2016/0340757 A1 11/2016 Higaki et al.

FOREIGN PATENT DOCUMENTS

| CN | 104995321 A | 10/2015 |
|---|---|---|
| EP | 0775753 A1 | 5/1997 |
| EP | 2907883 A1 | 8/2015 |
| EP | 3208352 A1 | 8/2017 |
| EP | 3392357 A1 | 10/2018 |
| JP | H01-108118 A | 4/1989 |
| JP | 01133920 A | 5/1989 |
| JP | 03-173725 A | 7/1991 |
| JP | 09-176756 A | 7/1997 |
| JP | 09-194211 A | 7/1997 |
| JP | H09-208222 A | 8/1997 |
| JP | 09-291320 A | 11/1997 |

(Continued)

OTHER PUBLICATIONS

International Search Report dated Mar. 21, 2017, issued for PCT/JP2017/006327.
Examination Report dated May 10, 2019, issued in the AU Patent Application No. 2017222881.
Supplementary European Search Report dated Jun. 27, 2019, issued in the EP Patent Application No. 17756472.1.
Industrial Analytical Chemistry, ed. Zhang Xie, Chemical Industry Press, Aug. 2003, pp. 127-128. (cited in Nov. 1, 2019 OA for CN201780010363.5; See the CN OA as a concise explanation of the relevance).
Office Action dated Nov. 1, 2019, issued in the CN Patent Application No. 201780010363.5 and English translation thereof.
International Search Report issued to International Application No. PCT/JP2014/061783 dated Aug. 5, 2014.

(Continued)

*Primary Examiner* — Steven J Bos
(74) *Attorney, Agent, or Firm* — Locke Lord LLP; James E. Armstrong, IV; Nicholas J. DiCeglie, Jr.

(57) ABSTRACT

A method for recovering scandium, by which scandium is able to be recovered from nickel oxide ore. The present invention comprises: a leaching step S1 for obtaining a leachate by leaching a nickel oxide ore containing scandium with use of sulfuric acid; a neutralization step by adding a neutralizing agent thereto; a sulfurization step by adding a sulfurizing agent to the post-neutralization solution; an ion exchange step by bringing the post-sulfurization solution into contact with a chelating resin; a dissolution step by obtaining a precipitate of scandium hydroxide by adding an alkali into the scandium eluent, and subsequently adding an acid solution to the scandium hydroxide; a solvent extraction step by bringing the scandium acid dissolution liquid into contact with a neutral extractant; and a scandium recovery step by adding oxalic acid to the extraction residue and subsequently roasting the salt of scandium oxalate.

15 Claims, 2 Drawing Sheets

(56) References Cited

FOREIGN PATENT DOCUMENTS

| JP | 2000-507308 A | | 6/2000 |
|---|---|---|---|
| JP | 3344194 B2 | | 11/2002 |
| JP | 3428292 B2 | | 7/2003 |
| JP | 3430973 B2 | | 7/2003 |
| JP | 2014-001430 A | | 1/2014 |
| JP | 2014-012901 A | | 1/2014 |
| JP | 2014/177391 | * | 9/2014 |
| JP | 2014-218719 A | | 11/2014 |
| JP | 2015-057505 A | | 3/2015 |
| JP | 2015-163729 A | | 9/2015 |
| WO | 2012/014685 A1 | | 2/2012 |
| WO | 2014/181721 A1 | | 11/2014 |
| WO | WO-2015/115269 | * | 6/2015 |
| WO | 2015/115269 A1 | | 8/2015 |

OTHER PUBLICATIONS

Office Action issued to U.S. Appl. No. 14/437,767, dated Jan. 15, 2016.
Extended European search report issued to EP Patent Application No. 14794541.4, dated May 12, 2016.
Office Action issued in the U.S. Appl. No. 15/115,030, dated Nov. 3, 2017.
Weiwei Wang et al., "Metallurgical processes for scandium recovery from various resources: A review", Hydrometallurgy, Elsevier Scientific Publishing CY. Amsterdam, NL, vol. 108, No. 1, Mar. 5, 2011, pp. 100-108.
Extended European Search Report for European Patent Application No. 15742736.0 dated Feb. 3, 2017.
"Kidozairyou to Oyogijutsu (Rare earth materials and application technique)", Edited by Kouka Ryu, published by Chemical Industry Press, May 2005, pp. 484-493.
Office Action for Chinese Patent Application No. 201580004295.2 dated Dec. 9, 2016.
Notice of Reasons for Rejection issued to JP Application No. 2014-065879, dated Nov. 17, 2015.
Notice of Reasons for Rejection issued to JP Application No. 2014-065879, dated Mar. 1, 2016.
Wang Weiwei et al., "Recovery of scandium from synthetic red mud leach solutions by solvent extraction with D2EHPA," Sep Purif Technol, NL, Apr. 19, 2013, vol. 108, p. 96-102.
Moriyasu, Kazuhisa et al., "Synthesis of hydroxyiminodiacetic acid-chelating resin and the properties of adsorption and separation for rare earth metal ion," Japan Analyst, Japan, Sep. 1990, vol. 39(9), pp. 475-480 and an English abstract thereof.
"Scandium Patent Comparison Table for Pacific Metals Co. Ltd. and Sumitomo Metal Mining Co. Ltd." Received Nov. 5, 2015, for Japanese patent application No. 2014-065879.
International Search Report issued to International Application No. PCT/JP2015/051501 dated Apr. 21, 2015.

* cited by examiner

METHOD FOR RECOVERING SCANDIUM

TECHNICAL FIELD

The present invention relates to a method for recovering scandium, more specifically, the present invention relates to a method for recovering scandium in which scandium contained in nickel oxide ore is efficiently recovered by combining an ion exchange treatment using a chelating resin and a solvent extraction treatment using a neutral extractant.

BACKGROUND ART

Scandium is extremely useful as an additive for a high strength alloy and an electrode material for a fuel cell. However, scandium has not yet been used widely due to the small production quantity and high cost thereof.

Incidentally, scandium is contained in nickel oxide ore such as laterite ore and limonite ore in a trace amount. However, nickel oxide ore has not been industrially utilized as a nickel raw material for a long period of time since the grade of nickel contained therein is low. For this reason, it has also been rarely studied to industrially recover scandium from nickel oxide ore.

However, in recent years, the HPAL process has been emerging as a practical method, in which nickel oxide ore is introduced into a pressure vessel along with sulfuric acid and heated at a high temperature of about 240° C. to 260° C. to separate the mixture into a leachate containing nickel and a leach residue by solid-liquid separation. In this HPAL process, a neutralizing agent is added to the leachate obtained to separate the impurities and then a sulfurizing agent is added to the leachate from which the impurities have been separated to recover nickel as nickel sulfide. Thereafter, electric nickel or a nickel salt compound can be obtained by treating nickel sulfide thus obtained according to an existing nickel metallurgy process.

In the case of using such a HPAL process, scandium, which has been contained in nickel oxide ore, is contained in the leachate together with nickel (see Patent Document 1). Thereafter, a neutralizing agent is added to the leachate obtained by the HPAL process to separate the impurities and then a sulfurizing agent is added to the leachate from which the impurities have been separated to recover nickel as nickel sulfide as well as to contain scandium in the acidic solution after the addition of a sulfurizing agent (post-sulfuration liquid). Hence, nickel and scandium can be effectively separated from each other by being treated according to the HPAL process.

As a method for recovering scandium from the acidic solution described above, for example, a method has been proposed in which scandium is adsorbed to a chelating resin containing an iminodiacetate salt as a functional group and the like to be separated from the impurities, enriched, and recovered (see Patent Documents 2 to 4).

Meanwhile, a method has also been proposed in which scandium is recovered from an acidic solution obtained by a hydrometallurgical treatment of nickel oxide ore by a solvent extraction treatment (see Patent Document 5). In this method disclosed in Patent Document 5, first, an organic solvent prepared by diluting 2-ethylhexylsulfonic acid-mono-2-ethylhexyl with kerosene is added to a scandium-containing solution of an aqueous phase containing at least one or more kinds among iron, aluminum, calcium, yttrium, manganese, chromium, and magnesium in addition to scandium and the scandium component is extracted into the organic solvent. Subsequently, in order to separate yttrium, iron, manganese, chromium, magnesium, aluminum, and calcium which have been extracted into the organic solvent together with scandium, an aqueous solution of hydrochloric acid is added to the organic solvent and scrubbing is performed to remove these, then an aqueous solution of NaOH is added to the resultant organic solvent to form a slurry containing $Sc(OH)_3$ converted from scandium remained in this organic solvent, $Sc(OH)_3$ obtained by filtration of this slurry is dissolved with hydrochloric acid to obtain an aqueous solution of scandium chloride. Thereafter, oxalic acid is added to the aqueous solution of scandium chloride thus obtained to precipitate scandium oxalate, the precipitate is filtered to separate iron, manganese, chromium, magnesium, aluminum, and calcium into the filtrate, and then the precipitate filtered is calcined to obtain high purity scandium oxide.

However, the distribution of iron, aluminum, chromium and the like into the eluent is significantly small by only using a chelating resin singly, but these impurities are contained in the raw material in a large amount and it is thus required to perform the adsorption and elution operations plural times in order to separate these impurities. In addition, the adsorption and elution behavior of a plurality of other impurities contained in a significantly small amount is inferior to that of scandium, but the distribution thereof into the eluent is high, and it is thus significantly difficult to separate the plurality of other impurities.

In addition, in the recovery treatment by solvent extraction, the grade of scandium contained in nickel oxide ore is significantly low, and it is thus difficult to directly treat the process liquid in terms of cost since the capacity of the facility increases.

In addition, it is also known that actinoid elements such as uranium and thorium often coexist with rare earth elements such as scandium in trace amounts. The adsorption and desorption behavior of uranium and thorium to the chelating resin described above is approximately the same as that of scandium. That is, not only scandium but also a large number of actinoid elements are adsorbed to the chelating resin in the separation method using the chelating resin described above. In addition, not only scandium but also actinoid elements are eluted and the actinoid elements cannot be separated from scandium in a case in which an acidic liquid is allowed to pass through the chelating resin for elution.

Meanwhile, particularly the actinoid elements described above are demanded to be avoided since a quality of high purity is demanded to secure the required properties, for example, in the case of intending to use scandium as a material of a fuel cell and the like. However, there has not been a method for effectively separating scandium from these impurity elements including actinoid elements.

As described above, a method, which is suitable for industrially recovering high purity scandium from nickel oxide ore by effectively separating scandium from impurity elements, has not been found.

Patent Document 1: Japanese Unexamined Patent Application, Publication No. H03-173725

Patent Document 2: Japanese Unexamined Patent Application, Publication No. H01-133920

Patent Document 3: Japanese Unexamined Patent Application, Publication No. H09-176756

Patent Document 4: Japanese Unexamined Patent Application, Publication No. H09-194211

Patent Document 5: Japanese Unexamined Patent Application, Publication No. H09-291320

DISCLOSURE OF THE INVENTION

Problems to be Solved by the Invention

The present invention has been proposed in view of the circumstances as described above, and an object thereof is to provide a method for recovering scandium, which makes it possible to simply and efficiently recover high grade scandium from nickel oxide ore.

Means for Solving the Problems

The present inventors have conducted extensive studies to solve the problems described above. As a result, the present inventors have found out that high grade scandium can be simply and efficiently obtained, by separating scandium contained in nickel oxide ore using a chelating resin, subjecting a scandium-dissolved acid liquid obtained by dissolving a hydroxide precipitate obtained from a scandium eluate in an acid solution to solvent extraction, and roasting the scandium-containing substance obtained from the raffinate liquid generated by the solvent extraction, whereby the present invention has been completed. That is, the present invention provides the following.

(1) A first embodiment of the present invention provides a method for recovering scandium including a leaching step of leaching nickel oxide ore containing scandium with sulfuric acid at high temperature and high pressure to obtain a leachate and a leach residue, a neutralization step of adding a neutralizing agent to the leachate to obtain a neutralized precipitate and a post-neutralization liquid, a sulfuration step of adding a sulfurizing agent to the post-neutralization liquid to obtain nickel sulfide and a post-sulfuration liquid, an ion exchange step of bringing the post-sulfuration liquid into contact with a chelating resin to adsorb scandium in the post-sulfuration liquid to the chelating resin and thus to obtain a scandium eluate, a dissolution step of adding an alkali to the scandium eluate to obtain a precipitate of scandium hydroxide, then adding an acid solution to the scandium hydroxide, and performing acid dissolution to obtain a scandium-dissolved acid liquid, a solvent extraction step of bringing the scandium-dissolved acid liquid into contact with a neutral extractant to extract and separate impurity elements other than scandium and to obtain a raffinate liquid containing scandium, and a scandium recovering step of adding oxalic acid to the raffinate liquid to generate a salt of scandium oxalate and roasting the salt of scandium oxalate to obtain scandium oxide.

(2) A second embodiment of the present invention provides the method for recovering scandium according to the first embodiment, in which the chelating resin is a resin containing iminodiacetic acid as a functional group, and the ion exchange step includes an adsorption step of bringing the post-sulfuration liquid into contact with the chelating resin to adsorb the scandium to the chelating resin, an aluminum removing step of bringing a sulfuric acid solution at 0.1 N or less into contact with the scandium-adsorbed chelating resin in the adsorption step to remove aluminum adsorbed to the chelating resin in the adsorption step, a scandium elution step of bringing a sulfuric acid solution at 0.3 N or more and less than 3 N into contact with the chelating resin subjected to the aluminum removing step to obtain the scandium eluate, and a chromium removing step of bringing a sulfuric acid solution at 3 N or more into contact with the chelating resin subjected to the scandium elution step to remove chromium adsorbed to the chelating resin in the adsorption step.

(3) A third embodiment of the present invention provides the method for recovering scandium according to the first or second embodiment, in which the scandium-dissolved acid liquid is brought into contact with the neutral extractant while maintaining a pH of the scandium-dissolved acid liquid in a range of between 1.0 or more and 2.5 or less in the solvent extraction step.

(4) A fourth embodiment of the present invention provides the method for recovering scandium according to any one of the first to third embodiments, in which the solvent extraction step includes an extraction step of mixing the scandium-dissolved acid liquid with an organic solvent containing the neutral extractant and separating the mixture into a post-extraction organic solvent extracted impurity elements other than scandium and a raffinate liquid, a scrubbing step of mixing the post-extraction organic solvent with an acid solution having a concentration of 1.0 mol/l or more and 5.0 mol/l or less and recovering scandium from the post-extraction organic solvent to obtain a post-washing organic solvent, and a backward extraction step of adding a backward extractant to the post-washing organic solvent and backward extracting impurity elements from the post-washing organic solvent to obtain a backward extraction liquid.

(5) A fifth embodiment of the present invention provides the method for recovering scandium according to any one of the first to fourth embodiments, in which a scandium-dissolved nitric acid liquid as a scandium-dissolved acid liquid is obtained by adding a nitric acid solution to the scandium hydroxide and performing acid dissolution in the dissolution step.

(6) A sixth embodiment of the present invention provides the method for recovering scandium according to any one of the first to fourth embodiments, in which a scandium-dissolved hydrochloric acid liquid as a scandium-dissolved acid liquid is obtained by adding a hydrochloric acid solution to the scandium hydroxide and performing acid dissolution in the dissolution step.

(7) A seventh embodiment of the present invention provides the method for recovering scandium according to the sixth embodiment, in which in the solvent extraction step, a chloride concentration in the scandium-dissolved hydrochloric acid liquid obtained in the dissolution step is adjusted to 2.0 mol/l or more and 6.0 mol/l or less and the scandium-dissolved hydrochloric acid liquid is brought into contact with the neutral extractant.

(8) An eighth embodiment of the present invention provides the method for recovering scandium according to any one of the first to seventh embodiments, in which the scandium recovering step includes a step of adding sodium hydroxide having a concentration of 5.0 mol/l or more and 8.0 mol/l or less to the raffinate liquid obtained in the solvent extraction step to obtain a precipitate of scandium hydroxide, a step of dissolving the precipitate of scandium hydroxide obtained with sulfuric acid or hydrochloric acid and adding oxalic acid to the dissolved liquid obtained through the dissolution to obtain a crystal of scandium oxalate, and a step of calcining the crystal of scandium oxalate.

Effects of the Invention

According to the present invention, it is possible to simply and efficiently recover high grade scandium from nickel oxide ore. Particularly in a case in which actinoid elements are contained in nickel oxide ore of a raw material, these elements can be effectively separated from scandium.

PREFERRED MODE FOR CARRYING OUT THE INVENTION

Hereinafter, specific embodiments of the present invention (hereinafter referred to as the "present embodiments") will be described in detail with reference to the drawings, but the present invention shall not be limited to the following embodiments and can be implemented with appropriate modifications made without departing from the spirit of the present invention.

<<1. Overview of Method for Recovering Scandium>>

Figure 1:
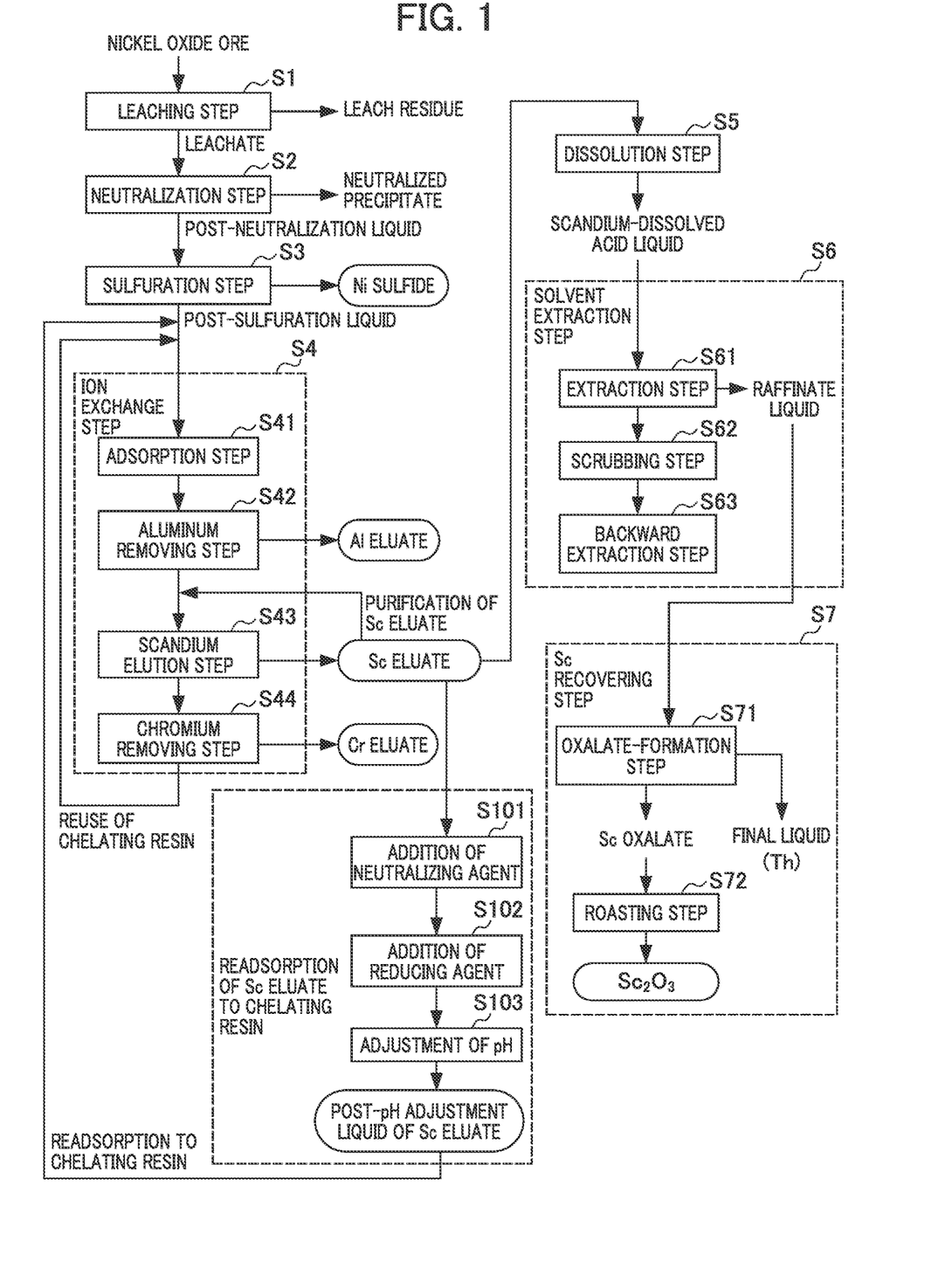
FIG. 1 is a flow diagram for explaining an example of the entire flow to which a method for recovering scandium according to the present invention is applied.

FIG. 1 is a flow diagram for explaining a method for recovering scandium according to the present embodiment. This method for recovering scandium is a method to simply and efficiently recover only scandium having a high purity by neutralizing the leachate obtained by leaching nickel oxide ore with an acid such as sulfuric acid and separating scandium and uranium and thorium contained in the hydroxide which is obtained by the neutralization treatment and contains scandium, uranium and thorium.

Specifically, the method for recovering scandium according to the present embodiment includes a leaching step S1 of leaching nickel oxide ore containing scandium with an acid such as sulfuric acid at high temperature and high pressure to obtain a leachate and a leach residue, a neutralization step S2 of adding a neutralizing agent to the leachate to obtain a neutralized precipitate and a post-neutralization liquid, a sulfuration step S3 of adding a sulfurizing agent to the post-neutralization liquid to obtain nickel sulfide and a post-sulfuration liquid, an ion exchange step S4 of bringing the post-sulfuration liquid into contact with a chelating resin to adsorb scandium in the post-sulfuration liquid to the chelating resin and thus to obtain a scandium eluate, a dissolution step S5 of adding an alkali to the scandium eluate to obtain a precipitate of scandium hydroxide and then adding an acid solution such as a hydrochloric acid or nitric acid solution to the scandium hydroxide to obtain a scandium-dissolved acid liquid, a solvent extraction step S6 of bringing the scandium-dissolved acid liquid into contact with a neutral extractant to extract and separate impurity elements other than scandium and to obtain a raffinate liquid containing scandium; and a scandium recovering step S7 of generating an oxalate salt of scandium contained in the raffinate liquid and roasting the scandium oxalate to obtain scandium oxide.

As described above, in the present embodiment, ion exchange (ion exchange step) and solvent extraction (solvent extraction step) are used concurrently, and further, a precipitate containing scandium is generated from a scandium eluate and the precipitate is dissolved in an acid solution of hydrochloric acid or nitric acid to obtain a scandium-dissolved acid liquid (dissolution step) prior to the solvent extraction after the ion exchange when scandium is recovered and purified. Moreover, the method for recovering scandium is characterized in that the scandium-dissolved acid liquid is subjected to solvent extraction and oxalic acid is added to the raffinate liquid, which has not been extracted by solvent extraction, to obtain crystals of scandium oxalate. According to such a method, it is possible to separate impurities including uranium and thorium at a higher grade and to simply and stably perform the scandium recovering operation by using a compact facility even from a raw material containing a great number of impurities, such as nickel oxide ore.

<<2. Respective Steps in Method for Recovering Scandium>>

Hereinafter, the respective steps in the method for recovering scandium will be described in more detail with reference to the flow diagram illustrated in FIG. 1.

(1) Leaching Step

In the leaching step S1, nickel oxide ore containing scandium is charged into a high temperature pressurized vessel (autoclave) and the like together with an acid such as sulfuric acid and the nickel oxide ore is leached with the acid while performing a stirring treatment in an environment of a high temperature of 240° C. to 260° C. and a high pressure to generate a leach slurry containing a leachate and a leach residue. Note that the treatment in the leaching step S11 may be performed in accordance with a conventionally known HPAL process and is described in, for example, Patent Document 1.

Here, examples of nickel oxide ore mainly include so-called laterite ore such as limonite ore and saprolite ore. The content of nickel in laterite ore is usually 0.8 to 2.5 wt %, and nickel is contained as a hydroxide or a silica magnesia (magnesium silicate) mineral. These nickel oxide ores contain components such as aluminum, chromium and iron in a large amount in addition to valuable metals such as nickel, cobalt and scandium.

In the leaching step S1, the leach slurry which contains a leachate and a leach residue and is thus obtained is separated into a leachate containing nickel, cobalt, scandium, and the like and a leach residue which is hematite by solid-liquid separation while being washed. In this solid-liquid separation treatment, for example, the leach slurry is mixed with the washing liquid, and then the solid-liquid separation treatment is performed by using a solid-liquid separation apparatus such as a thickener using a coagulant to be supplied from a coagulant supply facility and the like. Specifically, the leach slurry is first diluted with the washing liquid, and then the leach residue in the slurry is enriched as a precipitate in the thickener. Note that in this solid-liquid separation treatment, it is preferable to perform solid-liquid separation while washing the leach slurry in multiple stages by connecting the solid-liquid separation tank such as a thickener in multiple stages.

(2) Neutralization Step

In the neutralization step S2, a neutralizing agent is added to the leachate obtained through the leaching step S1 described above to adjust the pH and a neutralized precipitate containing impurity elements and a post-neutralization liquid are obtained. By the neutralization treatment in the neutralization step S2, valuable metals such as scandium and nickel are contained in the post-neutralization liquid while most impurities including iron and aluminum are contained in the neutralized precipitate.

As the neutralizing agent, conventionally known substances may be used, and examples thereof may include calcium carbonate, slaked lime, and sodium hydroxide.

In the neutralization treatment in the neutralization step S2, the pH is adjusted preferably to the range of 1 to 4 and more preferably to the range of 1.5 to 2.5 while suppressing oxidation of the leachate separated. When the pH is less than 1, neutralization may be insufficient, and the neutralized precipitate and the post-neutralization liquid may not be separated. Meanwhile, when the pH is more than 4, not only impurities including aluminum but also valuable metals such as scandium and nickel may be contained in the neutralized precipitate.

(3) Sulfuration Step

In the sulfuration step S3, a sulfurizing agent is added to the post-neutralization liquid obtained through the neutralization step S2 and nickel sulfide and a post-sulfuration liquid are obtained. By the sulfuration treatment in the sulfuration step S3, nickel, cobalt, zinc, and the like are converted into sulfides and scandium and the like are contained in the post-sulfuration liquid.

Specifically, in the sulfuration step S3, a sulfurizing agent such as gaseous hydrogen sulfide, sodium sulfide, or hydrogenated sodium sulfide is blown into the post-neutralization liquid obtained and a sulfide (nickel cobalt mixed sulfide) containing nickel and cobalt with less impurity components and a post-sulfuration liquid which has a low and stabilized level of nickel concentration and contains scandium and the like are generated.

In the sulfuration treatment in the sulfuration step S3, the slurry of nickel cobalt mixed sulfide is subjected to the precipitation and separation treatment using a sedimentation apparatus such as a thickener to separate and recover nickel cobalt mixed sulfide from the bottom of the thickener. Meanwhile, the post-sulfuration liquid, which is an aqueous solution component, is recovered by being allowed to overflow. Note that the post-sulfuration liquid to be obtained is a sulfuric acid acidic solution.

Here, oxalic acid or a neutralizing agent to be described later can be directly added to the post-sulfuration liquid obtained by the sulfuration treatment in the sulfuration step S3 to obtain a salt or oxide of scandium and this can be roasted to obtain a solid of scandium oxide. However, the concentration of scandium contained in the leachate and post-sulfuration liquid described above is generally as low as about several tens to 100 mg/l, and it is preferable to perform an operation for enriching the leachate and post-sulfuration liquid by means such as an ion exchange treatment and a solvent extraction treatment to be described later in order to separate other impurities present at a higher concentration than scandium as well.

(4) Ion Exchange Step

In the ion exchange step S4, scandium contained in the post-sulfuration liquid is adsorbed to the chelating resin and a scandium eluate, from which impurity components have been removed, is obtained by bringing the post-sulfuration liquid obtained by the hydrometallurgical treatment of nickel oxide ore described above into contact with a chelating resin.

The post-sulfuration liquid contains aluminum and chromium, which have not been sulfurated by the sulfuration treatment in the sulfuration step S3 but have remained in the solution (post-sulfuration liquid) and trace amounts of uranium, thorium, and the like in some cases in addition to scandium desired. For this reason, it is preferable to enrich scandium by removing these impurities and to generate a scandium eluate when generating a hydroxide by subjecting this post-sulfuration liquid, which is an acidic solution, to a neutralization treatment.

The aspect of the ion exchange step S4 is not particularly limited, but it is preferable that the ion exchange step S4 includes an adsorption step S41 of bringing the post-sulfuration liquid into contact with a chelating resin to adsorb scandium to the chelating resin, an aluminum removing step S42 of bringing a sulfuric acid solution at 0.1 N or less into contact with the scandium-adsorbed chelating resin to remove aluminum, which has been adsorbed to the chelating resin in the adsorption step S41, a scandium elution step S43 of bringing a sulfuric acid solution at 0.3 N or more and 3 N or less into contact with the chelating resin, which has been subjected to the aluminum removing step S42, to obtain a scandium eluate, and a chromium removing step S44 of bringing a sulfuric acid solution at 3 N or more into contact with the chelating resin, which has been subjected to the scandium elution step S43, to remove chromium, which has been adsorbed to the chelating resin in the adsorption step S41, for example, as an example is illustrated in FIG. 1.

[Adsorption Step]

In the adsorption step S41, scandium is adsorbed to the chelating resin by bringing the post-sulfuration liquid into contact with a chelating resin. The chelating resin is not particularly limited, but it is preferable to use, for example, a resin containing iminodiacetic acid as a functional group.

Here, at the time of adsorption of scandium to the chelating resin in the adsorption step S41, the amount of impurities contained in the nickel oxide ore to be adsorbed to the chelating resin is smaller as the pH range of the solution is lower. Hence, it is possible to suppress adsorption of the impurities to the chelating resin by allowing a liquid in a pH region as low as possible to pass through the chelating resin. However, not only the amount of impurities adsorbed but also the amount of scandium adsorbed may decrease when the pH of the solution is less than 2.

[Aluminum Removing Step]

In the aluminum removing step S42, aluminum adsorbed to the chelating resin is removed by bringing a sulfuric acid solution preferably at 0.1 N or less into contact with the scandium-adsorbed chelating resin in the adsorption step S41.

At the time of removal of aluminum adsorbed to the chelating resin, it is preferable to maintain the pH of the sulfuric acid solution in a range of between 1 or more and 2.5 or less and it is more preferable to maintain the pH in a range of between 1.5 or more and 2.0 or less. Not only aluminum but also scandium may be removed from the chelating resin when the pH of the sulfuric acid solution is less than 1. Meanwhile, aluminum may not be properly removed from the chelating resin when the pH of the sulfuric acid solution exceeds 2.5.

[Scandium Elution Step]

In the scandium elution step S43, a scandium eluate is obtained by bringing a sulfuric acid solution preferably at 0.3 N or more and less than 3 N into contact with the chelating resin, which has been subjected to the aluminum removing step S42.

At the time of obtainment of the scandium eluate, it is preferable to maintain the normality of the sulfuric acid solution to be used as the eluent in a range of between 0.3 N or more and less than 3 N and it is more preferable to maintain the normality in a range of between 0.5 N or more and less than 2 N. Not only scandium but also chromium may be contained in the scandium eluate when the normality of the sulfuric acid solution is 3 N or more. Meanwhile, scandium may not be properly removed from the chelating resin when the normality of the sulfuric acid solution is less than 0.3 N.

[Chromium Removing Step]

In the chromium removing step S44, chromium adsorbed to the chelating resin is removed by bringing a sulfuric acid solution preferably at 3 N or more into contact with the chelating resin, which has been subjected to the scandium elution step S43.

At the time of removal of chromium adsorbed to the chelating resin, chromium is not properly removed from the chelating resin in some cases when the normality of the sulfuric acid solution to be used as an eluent is less than 3 N. Hence, it is preferable to perform the treatment by bringing a sulfuric acid solution at 3 N or more into contact with the chelating resin.

[Iron Removing Step]

In addition, there is a case in which iron is contained in the leachate obtained from nickel oxide ore as an impurity in some cases although it is not illustrated. In this case, it is preferable to remove iron adsorbed to the chelating resin by bringing a sulfuric acid solution having a normality lower than the normality of the sulfuric acid solution to be used in the aluminum removing step S42 into contact with the chelating resin to which scandium has been adsorbed prior to the aluminum removing step S42.

At the time of removal of iron adsorbed to the chelating resin, it is preferable to maintain the pH of the sulfuric acid solution in a range of between 1 or more and 3 or less. Not only iron but also scandium may be removed from the chelating resin when the pH of the sulfuric acid solution is less than 1. Meanwhile, iron may not be properly removed from the chelating resin when the pH of the sulfuric acid solution exceeds 3.

<Readsorption of Scandium Eluate to Chelating Resin>

In addition, it is preferable to perform a treatment for readsorbing the scandium eluate obtained to the chelating resin although it is not an essential aspect.

Specifically, a neutralizing agent is added to the scandium eluate obtained through the scandium elution step S43 to adjust the pH preferably to a range of between 2 or more and 4 or less and more preferably to a range of between 2.7 or more and 3.3 or less taking the pH 3 as the center (Step S101), subsequently, a reducing agent is added (Step S102), and further, the pH of the liquid is adjusted preferably to a range of between 1 or more and 2.5 or less and more preferably to a range of between 1.7 or more and 2.3 or less taking the pH 2 as the center by the addition of sulfuric acid (Step S103). A post-pH adjustment liquid of the scandium eluate is obtained by this, and the treatment in the ion exchange step S4 described above is performed again using this post-pH adjustment liquid.

It is possible to further increase the grade of scandium to be recovered by repeatedly readsorbing the scandium eluate obtained to the chelating resin and performing the treatment in the ion exchange step S4 in this way. It is also possible to decrease the cost of chemicals and the scale of facility when scandium is separated from scandium eluate.

At the time of readsorption of the scandium eluate to the chelating resin, it is preferable to add the reducing agent (Step S102) so that the oxidation-reduction potential (ORP) is maintained in a range of between more than 200 mV and 300 mV or less as the value measured using the silver/silver chloride electrode as a reference electrode. The sulfur component derived from the sulfurizing agent added may precipitate as a fine solid when the ORP is 200 mV or less. Thereupon, the filter cloth is clogged at the time of the filtration treatment after the sulfuration, this decreases the efficiency of the solid-liquid separation and causes a decrease in productivity, also clogging of the resin tower or bias of liquid flow may occur when the liquid repasses through the chelating resin, and this may cause ununiform liquid pass and the like. Meanwhile, a problem may arise that the residual iron ions and the like are adsorbed to the resin to inhibit adsorption of scandium when the ORP exceeds 300 mV.

As the neutralizing agent to be added to the scandium eluate, conventionally known one can be used and examples thereof may include calcium carbonate. In addition, as the reducing agent to be added after the pH adjustment, conventionally known one can be used and examples thereof may include sulfurizing agents such as gaseous hydrogen sulfide and sodium sulfide, gaseous sulfur dioxide, hydrazine, and metal iron.

As the chelating resin at the time of readsorption of the scandium eluate to the chelating resin, the chelating resin, which has been already used, may be reused or a fresh chelating resin may be used. It is preferable to reuse the chelating resin which has been subjected to the chromium removing step S44 or to use a fresh chelating resin from the viewpoint of preventing contamination by impurities. Not only contamination by impurities can be prevented but also the amount of chelating resin used can be decreased particularly by reusing the chelating resin which has been subjected to the chromium removing step S44.

<Purification of Scandium Eluate>

In addition, it is also possible to subject the scandium eluate obtained through the scandium elution step S43 to the treatment in the scandium elution step S43 again, that is, it is also possible to perform a treatment for bringing the scandium eluate obtained into contact with the chelating resin which has been subjected to the aluminum removing step S42. It is possible to increase the concentration of the scandium eluate by repeatedly performing the scandium elution step S43 using the scandium eluate in this way.

The concentration of scandium to be recovered increases as the scandium elution step S43 is repeated more times, but the extent of increase in the concentration of scandium to be recovered gradually decreases when the scandium elution step S43 is repeated too many times. For this reason, industrially, the number of repeated times of the scandium elution step S43 is preferably about 8 times or less.

(5) Dissolution Step

Next, a dissolution step S5 is provided subsequently to the ion exchange step S4 described above, and a treatment is performed in which a precipitate of scandium contained in the scandium eluate is generated and separated from impurities and this precipitate is dissolved in an acid solution to generate an extraction starting liquid to be subjected to solvent extraction in the next step.

As a method for enriching scandium in the dissolution step S, namely, a method for generating a precipitate of scandium and separating the precipitate from impurities, a method by hydroxylation neutralization can be used.

[Hydroxylation Neutralization]

In the hydroxylation neutralization treatment of the scandium eluate, the neutralization treatment is performed by adding a neutralizing agent to the scandium eluate obtained through the ion exchange step S4 described above and a hydroxide precipitate of scandium and a post-neutralization liquid containing impurity components are generated.

As the neutralizing agent to be added to the scandium eluate, conventionally known one can be used and examples thereof may include alkalis such as slaked lime and sodium hydroxide. Among these, it is preferable to use sodium hydroxide or the like as a neutralizing agent since gypsum is generated when a neutralizing agent contains Ca in a case in which the scandium eluate is a sulfuric acid acidic solution.

The pH when the neutralizing agent is added is not particularly limited, but it is preferable to adjust the pH to a range of between 8 or more and 9 or less. The neutralization may be insufficient and scandium in the scandium eluate may not be sufficiently recovered as a precipitate when the pH is less than 8. Meanwhile, the amount of the neutralizing agent used increases when the pH exceeds 9, and this is not preferable since the cost increases.

Note that it is effective to perform two-stage neutralization of the first stage neutralization for precipitating only iron at the time of the hydroxylation neutralization treatment and the second stage neutralization to be performed after the precipitate obtained is filtered in order to lower the iron grade.

[Dissolution using Acid]

Next, in the present embodiment, an acid solution, specifically, an acid solution of either nitric acid or hydrochloric acid is added to the precipitate of scandium hydroxide obtained by the hydroxylation neutralization treatment to dissolve the precipitate is dissolved in the acid solution and to generate a scandium-dissolved acid liquid. In the method for recovering scandium according to the present embodiment, the scandium-dissolved acid liquid thus obtained is the treatment target (extraction starting liquid) of the solvent extraction treatment in the solvent extraction step S6 of the next step.

Specifically, in the case of using a nitric acid solution as the acid solution for dissolving the precipitate of scandium hydroxide, the concentration of the nitric acid solution is not particularly limited but it is preferably in a range of between 2.0 mol/l or more and 5.0 mol/l or less and more preferably 3.0 mol/l or more and 4.0 mol/l or less.

In addition, in the case of dissolving the precipitate using a hydrochloric acid solution as the acid solution, the concentration of the hydrochloric acid solution is not particularly limited and it may be set to a concentration suitable for the solvent extraction treatment in the solvent extraction step S6 to be described later.

In addition, at the time of dissolution of the precipitate in an acid solution, it is preferable to dissolve the precipitate in the vicinity of the solubility of the precipitate obtained. This makes it possible to once precipitate a solid and to redissolve the solid at an arbitrary concentration, and this is thus industrially significantly preferable from the viewpoint of being able to arbitrarily select the scandium concentration and to decrease not only the amount of liquid in the solvent extraction step S6 of the next step but also the scale of the facility.

In the present embodiment, it is possible to greatly remove the impurities contained in the scandium eluate and to decrease the number of man-hour for the ion exchange step S4 and the solvent extraction step S6 of the next step by providing the dissolution step S5 subsequently to the ion exchange step S4 in this way. In addition, it is possible to arbitrarily adjust the concentration of the extraction starting liquid to be subjected to solvent extraction and thus to further stabilize the operation by a cutback in the capital investment due to a scale-down in the facility for the solvent extraction step S6 and stabilization of the concentration of the starting liquid.

(6) Solvent Extraction Step

In the solvent extraction step S6, a solvent extraction treatment is performed by bringing the scandium-dissolved acid liquid (extraction starting liquid) obtained by dissolving scandium hydroxide in a hydrochloric acid or nitric acid solution in the dissolution step S5 described above into contact with a neutral extractant, and an organic solvent into which the impurities have been extracted and a raffinate liquid containing scandium are obtained.

By such a solvent extraction treatment, it is possible to efficiently and effectively separate the impurities other than scandium from scandium and to increase the purity of scandium. Particularly in the present embodiment, impurities can be more effectively extracted with an extractant since the scandium-dissolved acid liquid obtained as described above is used as the target of the solvent extraction treatment.

The aspect of the solvent extraction step S6 is not particularly limited, but it is preferable that the solvent extraction step S6 includes an extraction step S61 of mixing the scandium-dissolved acid liquid with an organic solvent containing a neutral extractant and obtaining a post-extraction organic solvent and a raffinate liquid, a scrubbing step S62 of mixing this post-extraction organic solvent with a hydrochloric acid or nitric acid solution at a predetermined concentration and separating and recovering scandium which has been extracted into the extractant, and a backward extraction step S63 of adding a backward extractant to the organic solvent after the washing and backward extracting impurity elements from the post-washing organic solvent, for example, as an example thereof is illustrated in FIG. 1.

[Extraction Step]

In the extraction step S61, the scandium-dissolved acid liquid and an organic solvent containing a neutral extractant are mixed together and impurity elements other than scandium are selectively extracted. By this extraction treatment, an organic solvent containing impurities and a raffinate liquid having an increased purity of scandium are obtained.

As a neutral extractant, various kinds are known, and the neutral extractant is not particularly limited, but it is preferable to use an extractant containing phosphorus, specifically, TBP (tri-n-butyl phosphate) or the like. In the case of using TBP as an extractant, uranium and thorium contained in the solution can be extracted and efficiently separated from scandium for a nitric acid acidic scandium-dissolved liquid. In addition, mainly uranium contained in the solution can be extracted and efficiently separated from scandium for a hydrochloric acid acidic scandium-dissolved liquid.

At the time of the extraction treatment using a neutral extractant, it is preferable to use the extractant diluted with a hydrocarbon-based organic solvent or the like. For example, in the case of using TBP described above as a neutral extractant, the concentration of TBP in the organic solvent is set preferably to 10 vol % or more and 50 vol % or less and more preferably to 15 vol % or more and 25 vol % or less particularly to be about 20 vol % when the phase separation property at the time of extraction and backward extraction is taken into consideration.

In addition, the volume proportion of the organic solvent to the scandium-dissolved acid liquid at the time of extraction is not particularly limited, but it is preferable to set the volume proportion so that the molar quantity of the organic solvent is in a range of between 0.4 time or more and 1.0 time or less the molar quantity of the metals in the scandium-dissolved acid liquid.

Here, in the extraction treatment, it is preferable to adjust and maintain the pH of the scandium-dissolved acid liquid in a range of between 1.0 or more and 2.5 or less. When the pH of the scandium-dissolved acid liquid, which is the target of the extraction treatment, is less than 1.0, the extraction of uranium rarely proceeds and the extraction and separation effect may remarkably decrease in a case in which uranium is contained in the solution. In addition, there is a concern that the acidity of the scandium-dissolved acid liquid is too strong and the facility is likely to be corroded.

Meanwhile, when the pH of the scandium-dissolved acid liquid is in a state of exceeding 2.5 in the extraction treatment, scandium hydroxide is generated and causes cladding in some cases and it may be difficult to perform the operation.

It is more preferable to adjust and maintain the pH of the scandium-dissolved acid liquid in the extraction treatment in a range of between 1.5 or more and 2.0 or less, and this makes it possible to more efficiently and effectively extract uranium contained in the solution.

In addition, in the case of using a hydrochloric acid acidic solution (scandium-dissolved hydrochloric acid liquid) as the scandium-dissolved acid liquid in the extraction treatment, it is preferable to set the chloride concentration (T-Cl concentration) in the hydrochloric acid acidic solution at the time of extraction to 2.0 mol/l or more. It is possible to increase the extraction rate of uranium by setting the chloride concentration to 2.0 mol/l or more and performing the extraction treatment in this way.

Meanwhile, the upper limit value of the chloride concentration is preferably set to 6.0 mol/l or less. The chlorides of coexisting iron ions and the like are supersaturated, crystals precipitate, clad may be formed, and the operation may be hindered when the chloride concentration in the hydrochloric acid acidic solution exceeds 6.0 mol/l.

It is preferable to perform the adjustment of the chloride concentration in the hydrochloric acid acidic solution, for example, by adding a salt of an alkali metal such as sodium chloride or potassium chloride. Note that the acidity of the hydrochloric acid acidic solution is too strong, for example, when the chloride concentration is adjusted using hydrochloric acid, the pH may deviate to a lower range than the preferable range (pH of 1.0 or more and 2.5 or less) described above, and the uranium extracting and separating effect may decrease.

Note that the temperature condition in the extraction treatment is not particularly limited, and it is more preferable from the viewpoint of extraction efficiency as the temperature is relatively higher, but there is a danger that hydrochloric acid or nitric acid constituting the acid liquid volatilizes or ignites when the temperature is too high. Hence, it is preferable to perform the extraction treatment by setting the temperature to a range of between approximately 40° C. or more and 50° C. or less.

[Scrubbing (Washing) Step]

In the extraction step S61 described above, it is preferable to subject the organic solvent (organic phase) to a scrubbing (washing) treatment before backward extracting the extraction liquid so that scandium is separated into the aqueous phase and recovered from the extractant (scrubbing step S62) in a case in which scandium slightly coexists in the organic solvent into which impurities have been extracted.

It is possible to separate scandium into the washing liquid and to further increase the recovery rate of scandium by providing the scrubbing step S62 for washing the organic solvent and separating a trace amount of scandium extracted using the extractant in this way.

The solution (washing solution) to be used in scrubbing is not particularly limited, and for example, a hydrochloric acid solution, a sulfuric acid solution, a nitric acid solution and the like can be used, but the washing liquid recovered by scrubbing is purified together with the raffinate liquid after extraction and used in the recovery of scandium. For this reason, it is preferable to use a nitric acid solution or a hydrochloric acid solution of the same kind as the scandium-dissolved acid liquid, which is an extraction original liquid, in scrubbing as the washing solution. In other words, it is preferable to use a hydrochloric acid-based washing solution for a hydrochloric acid acidic scandium-dissolved liquid and a nitric acid-based washing solution for a nitric acid acidic scandium-dissolved liquid. In addition, it is preferable to use these washing solutions from the viewpoint of preventing hydrolysis of scandium due to an increase in pH as well. Note that it is also possible to use a liquid to which a water-soluble sulfate salt is added.

The concentration of the washing solution is not particularly limited, but it is preferable to set the concentration to a range of between 1.0 mol/l or more and 5.0 mol/l or less. More specifically, for example, in the case of using a nitric acid solution as the washing solution, a concentration range of between 2.0 mol/l or more and 5.0 mol/l or less is preferable and a concentration range of between 3.0 mol/l or more and 4.0 mol/l or less is more preferable.

The number of washing stages (number of washing times) in scrubbing also depends on the kind and concentration of the impurity elements, and it can be thus appropriately changed depending on the neutral extractant and extraction conditions. For example, in a case in which the phase ratio O/A of the organic phase (O) to the aqueous phase (A) is set to 1, scandium extracted into the organic solvent can be separated to a concentration less than the lower detection limit of the analyzer by setting the number of stages to about 3 to 5 stages.

[Backward Extraction Step]

In the backward extraction step S63, the impurity elements are backward extracted from the organic solvent into which the impurity elements have been extracted. Specifically, in the backward extraction treatment, a backward extraction solution (backward extraction starting liquid) is added to and mixed with an organic solvent containing an extractant to cause a reaction opposite to that in the extraction treatment in the extraction step S61, thus the impurity elements are backward extracted and a post-backward extraction liquid containing the impurity elements is obtained.

As described above, the impurity elements are selectively extracted using a neutral extractant such as TBP as an extractant in the extraction treatment of the scandium-dissolved acid liquid in the extraction step S61. Accordingly, it is preferable to use, for example, pure water as the backward extraction solution from the viewpoint of efficiently and effectively separating the impurity elements from the organic solvent containing an extractant and regenerating the extractant.

Note that the backward extraction treatment can be performed by adding a backward extraction solution to the extractant after scrubbing and mixing these together in the same manner in a case in which the organic solvent containing an extractant is subjected to a scrubbing treatment in the scrubbing step S62 described above.

The neutral extractant after the backward extraction solution such as pure water is added to the extractant after extraction or the extractant after scrubbing and the impurity elements are separated by performing the backward extraction treatment in this way can be repeatedly used again as an extractant in the extraction treatment in the extraction step S61.

<Scandium Recovering Step>

Next, in the scandium recovering step S7, scandium is recovered from the raffinate liquid which is obtained through the solvent extraction step S6 and contains scandium. In the scandium recovering step S7, a salt of scandium contained in the raffinate liquid is generated, then the solid scandium salt is roasted to generate scandium oxide, and thus scandium is recovered as scandium oxide.

Specifically, as an example is illustrated in FIG. 1, the scandium recovering step S7 includes an oxalate-formation step S71 of obtaining a crystal of scandium oxalate by adding oxalic acid to the raffinate liquid obtained through the solvent extraction step S6 and a roasting step S72 of calcining the crystal of scandium oxalate.

Particularly in the case of using a hydrochloric acid acidic solution (scandium-dissolved hydrochloric acid liquid) as the scandium-dissolved liquid, uranium is mainly extracted by the solvent extraction treatment using a neutral extractant and separation of thorium from scandium is slightly insufficient. However, scandium can be effectively separated from thorium which does not form a precipitate of an oxalate salt by adding oxalic acid to the raffinate liquid obtained and generating and precipitating scandium as an oxalate salt as a subsequent treatment.

[Oxalate-Formation Step]

The oxalate-formation step 71 is a step of generating a precipitate of scandium as described above, and it is a step of precipitating and separating scandium as a white crystal solid of scandium oxalate by adding oxalic acid to the raffinate liquid (post-extraction liquid) obtained through the solvent extraction step S6.

The amount of oxalic acid added is not particularly limited, but it is preferable to add oxalic acid in an amount to be 1 time or more and 2.5 times or less the equivalent amount required for precipitating scandium in the raffinate liquid as an oxalate salt, and it is more preferable to set the amount of oxalic acid added to an amount to be 1.05 times or more and 2.0 times or less the equivalent amount required for precipitation. The entire amount of scandium in the raffinate liquid may not be recovered when the amount of oxalic acid added is less than 1 time the equivalent amount required for precipitation. Meanwhile, when the amount of oxalic acid added exceeds 2.5 times the equivalent amount required for precipitation, scandium redissolves as the solubility of scandium oxalate increases and the recovery rate of scandium decreases or the amount of oxidizing agent such as sodium hypochlorite used increases in order to decompose excessive oxalic acid.

Note that the equivalent amount required for precipitating scandium as an oxalate salt can be defined as the amount (multiple) with respect to scandium when oxalic acid and scandium react to generate scandium oxalate as presented by the following Formula (i).

$$Sc_2(SO_4)_3 + 3C_2O_4H_2 \cdot 2H_2O \Rightarrow Sc_2(C_2O_4)_3 + 3H_2SO_4 \qquad (i)$$

The pH of the raffinate liquid at the time of the reaction for oxalate formation is not particularly limited, but the pH is set preferably to a range of about 0 or more and 2 or less and still more preferably to about 1, for example, in the case of using a nitric acid acidic solution. The solubility of scandium oxalate increases and the scandium recovery rate may decrease when the pH is too low such as less than 0. Meanwhile, the impurities contained in the raffinate liquid also form precipitates and this causes a decrease in scandium purity when the pH exceeds 2.

In addition, the pH is preferably set to a range of between about 0 or more and 0.5 or less in the case of using a hydrochloric acid acidic solution. The solubility of scandium oxalate increases and the scandium recovery rate may decrease when the pH is too low such as less than 0. In addition, it is possible to adjust the chloride concentration by using a salt of an alkali metal such as sodium chloride or potassium chloride as described above, but sodium and potassium to be attached to scandium oxalate also increase and these are required to be washed with water and removed. Note that it is preferable to set the pH in the case of using a hydrochloric acid acidic solution to 0.5 or less to be lower than that in the case of a nitric acid acidic solution from the viewpoint of preventing precipitation of impurities due to an excessive increase in pH.

Here, prior to the oxalate-formation treatment in the oxalate-formation step S71, the raffinate liquid which is obtained through the solvent extraction step S6 and contains scandium may be subjected to a neutralization treatment to generate a precipitate of scandium and remove impurities.

Specifically, sodium hydroxide (neutralizing agent) at a predetermined concentration is added to the raffinate liquid obtained through the solvent extraction step S6 to generate a precipitate of scandium hydroxide (raffinate liquid neutralization treatment). Subsequently, sulfuric acid or hydrochloric acid is added to the precipitate of scandium hydroxide thus obtained to dissolve the precipitate, and thus a scandium-dissolved liquid is obtained (dissolution treatment using hydrochloric acid).

The concentration of sodium hydroxide to be added in the raffinate liquid neutralization treatment is not particularly limited, but it is preferably in a range of between 5 mol/l or more and 8 mol/l or less. Scandium hydroxide is generated as a precipitate when the pH of the solution (raffinate liquid) is 8 or more, and it is thus preferable to add sodium hydroxide so that the pH of the raffinate liquid can be maintained in a range of between 8 or more and 9 or less when both the generation of a precipitate and the suppression of excessive sodium hydroxide are taken into consideration. In this regard, a precipitate of scandium hydroxide can be efficiently generated as the concentration of sodium hydroxide to be added is in a range of between 5 mol/l or more and 8 mol/l or less.

The scandium-dissolved liquid obtained by performing the neutralization treatment in this way can be subjected to the oxalate-formation treatment (oxalate-formation step S71) described above. This makes it possible to recover scandium having an even higher purity.

[Roasting Step]

In the roasting step S72, the precipitate of scandium oxalate obtained through the oxalate-formation step S71 is washed with water, dried and roasted, and scandium oxide is thus generated. Scandium can be recovered as significantly high grade scandium oxide by being subjected to a roasting treatment in this way.

The condition for the roasting treatment in the roasting step S72 is not particularly limited, but for example, the precipitate of scandium oxalate after drying may be placed in a tubular furnace and heated at about 900° C. for about 2 hours. Note that it is preferable to use a continuous furnace such as a rotary kiln for industrial production since both drying and roasting can be performed by using the same apparatus.

EXAMPLES

Below, the present invention will be described in more detail with reference to Examples, the present invention shall not in any sense be limited to these Examples.

Example 1

[Leaching Step S1]

First, nickel oxide ore was charged into an autoclave together with concentrated sulfuric acid and treated for 1 hour under a temperature condition of 245° C. to generate a leach slurry containing valuable metals such as scandium and nickel, and this slurry was separated into a leachate containing various valuable metals and a leach residue by solid-liquid separation.

[Neutralization Step S2]

Next, calcium carbonate (neutralizing agent) was added to the leachate obtained by the separation and a neutralization treatment was performed. By this neutralization treatment, a post-neutralization liquid containing valuable metals such as scandium and nickel and a neutralized precipitate containing most impurities including aluminum were obtained.

[Sulfuration Step S3]

Next, gaseous hydrogen sulfide (sulfurizing agent) was blown into the post-neutralization liquid thus obtained to convert nickel, cobalt, and zinc into sulfides, and the sulfides were separated from the post-sulfuration liquid, which was the liquid after this sulfuration treatment.

[Ion Exchange Step S4]

(Adsorption Step S41)

Next, slaked lime as a neutralizing agent was added to the post-sulfuration liquid obtained by the separation to adjust the pH of the solution to 1.6. In addition, in order to clarify the behavior of elements which were not contained in the liquid after the addition of slaked lime or were contained in a significantly small amount even if contained, reagents were added to some elements, and an adsorption original liquid having the composition shown in the following Table 1 was thus obtained.

TABLE 1

| Composition of adsorption original liquid (after adjustment) [mg/l] | | | | | | | | | | | | | | | |
|---|---|---|---|---|---|---|---|---|---|---|---|---|---|---|---|
| Sc | Al | Fe | Ni | Mg | Cr | Mn | Ti | Ca | U | Co | Th | Cu | V | Zr | Zn |
| 14 | 2800 | 1018 | 39 | 6146 | 38 | 2546 | 1.3 | 241 | 0.7 | 3 | 0.2 | 0.1 | 0.1 | 0.0 | 0.3 |

The adsorption original liquid having the composition shown in Table 1 was allowed to pass through a column packed with a chelating resin (product name: DIAION CR11, manufactured by Mitsubishi Chemical Corporation) containing iminodiacetic acid as a functional group. Note that the resin amount in the column was set to 40 liters, the flow rate was set to 5.3 liters per minute so that SV=8, and 2400 liters (Bed Volume: BV=2400/40=60) of the liquid was allowed to pass through the column. The temperature of the liquid supplied at the time of liquid passing was set to 60° C.

(Aluminum Removing Step S42)

Next, 800 liters of a sulfuric acid solution having a concentration of 0.1 N was allowed to pass through the chelating resin after the adsorption treatment at a flow rate of 27 liters per minute (SV=40). The washing liquid, which was discharged from the column and contained a large amount of aluminum, was stored as an aluminum-washed liquid and a part thereof was sampled and analyzed by ICP. As a result, analytical values of Ni: 7 mg/l, Mg: 1 mg/l, Mn: 4 mg/l, Fe: 1 mg/l, Al: 84 mg/l, and Sc: 3 mg/l, were obtained. Note that the analytical values of Cr and Ca were less than the measurable lower limit.

(Scandium Elution Step S43)

Thereafter, 400 liters of a sulfuric acid solution having a concentration of 1 N was allowed to pass through the chelating resin at a flow rate of 80 liters per minute (SV=40). The eluate discharged from the column was stored as a scandium eluate and a part thereof was sampled and analyzed. The analysis results for the scandium eluate are shown in the following Table 2. Note that "-" in the table indicates that it was not analyzed or the analytical value was less than the measurable lower limit.

TABLE 2

| Composition of scandium eluate [mg/l] | | | | | | | | | | | | | | | |
|---|---|---|---|---|---|---|---|---|---|---|---|---|---|---|---|
| Sc | Al | Fe | Ni | Mg | Cr | Mn | Ti | Ca | U | Co | Th | Cu | V | Zr | Zn |
| 292 | 150 | 52 | 19 | 1 | <1 | 1 | — | — | — | — | — | — | — | — | — |

(Chromium Removing Step S44)

Subsequently, 80 liters of a sulfuric acid solution having a concentration of 3 N was allowed to pass through the chelating resin at a flow rate of 2.6 liters per minute (SV=40). The washing liquid discharged from the column was stored as a chromium-washed liquid and a part thereof was sampled and analyzed. As a result, analytical values of Fe: 2 mg/l and Cr: 30 mg/l were obtained. Note that the analytical values of Ni, Mg, Mn, Al, Ca, and Sc were less than the measurable lower limit.

[Dissolution Step S5]

Next, sodium hydroxide was added to the scandium eluate having the composition shown in Table 2 to maintain the pH at 8 to 9, and a hydroxide precipitation of scandium was generated. This hydroxide precipitate was dissolved by adding a nitric acid solution thereto, thereby obtaining a chelate eluate hydroxide-dissolved liquid (scandium-dissolved nitric acid liquid). The analysis results on the composition of the dissolved liquid are shown in the following Table 3. Note that "-" in the table indicates that it was not analyzed or the analytical value was less than the measurable lower limit, and for example, the analytical values of Mg, Cr, Mn and Ca were less than the measurable lower limit.

TABLE 3

| Composition of scandium-dissolved nitric acid liquid [mg/l] | | | | | | | | | | | | | | |
|---|---|---|---|---|---|---|---|---|---|---|---|---|---|---|
| Sc | Al | Fe | Ni | Mg | Cr | Mn | Ti | Ca | U | Co | Th | Cu | V | Zr | Zn |
| 13,800 | 13,000 | 200 | 3,860 | — | — | — | — | — | 480 | — | 140 | — | — | — | — |

[Solvent Extraction Step S6]
(Extraction Step S61)

Next, a solvent extraction treatment was performed by using 103 liters of a scandium-dissolved nitric acid liquid having the composition shown in Table 3 as an extraction starting liquid. Specifically, the extraction starting liquid and 20.6 liters of an organic solvent adjusted to 50 vol % using tri-n-butyl phosphate (trade name: TBP, manufactured by DAIHACHI CHEMICAL INDUSTRY CO., LTD.) of a neutral extractant and TECLEAN N20 (manufactured by JXTG Nippon Oil & Energy Corporation) of an organic solvent were mixed together and stirred at room temperature for 60 minutes. By this solvent extraction treatment, an extraction organic phase containing impurities except scandium and a post-extraction liquid (raffinate liquid) were obtained. Note that clad was not formed at the time of this extraction and phase separation after still standing also quickly proceeded.

The compositions of various kinds of elements contained in the extraction organic phase thus obtained were analyzed. The percentages of the values obtained by dividing the amounts of various kinds of elements contained in the extraction organic phase by the amounts of the respective elements contained in the pre-extraction original liquid were calculated and the results thereof are shown in the following Table 4 as the extraction rate (%). Note that "-" in the table indicates that it was not analyzed or the analytical value was less than the measurable lower limit.

From the results on the extraction rate shown in Table 4, it was found that most scandium, which had been contained in the pre-extraction original liquid, remained in the post-extraction liquid (raffinate liquid) but was not extracted through the solvent extraction treatment in the extraction step S61. In addition, impurity elements such as uranium and thorium were extracted into the extraction organic phase at a high proportion. Note that it can be seen that the extraction organic phase rarely contains elements such as aluminum, nickel, magnesium, chromium, manganese, calcium, cobalt, copper, and zinc.

(Scrubbing (Washing) Step S62)

Next, a nitric acid solution having a concentration of 3 mol/l was mixed with 20.6 liters of the organic solvent (extraction organic phase) obtained through the extraction step S61 in an amount of 6.2 liters so as to have a phase ratio (O/A) of 0.3, and the mixture was stirred for 10 minutes for scrubbing (washing). Thereafter, the resultant mixture was allowed to still stand, the aqueous phase was separated, the organic phase was mixed again with 6.2 liters of a fresh nitric acid solution having a concentration of 3 mol/l and repeatedly washed, and the aqueous phase was separated in the same manner. Such a washing operation was repeated three times in total.

The compositions of the various kinds of elements contained in the washing liquid after this washing operation were analyzed. The percentages of the values obtained by dividing the amounts of various kinds of elements contained in the washing liquid by the amounts of the various kinds of elements in the extraction organic phase obtained through the extraction step S61 were calculated and the results thereof are shown in the following Table 5 as the recovery rate (%). Note that "-" in the table indicates that it was not analyzed or the analytical value was less than the measurable lower limit.

TABLE 4

| Extraction rate of various kinds of elements contained in extraction organic phase [%] | | | | | | | | | | | | | | |
|---|---|---|---|---|---|---|---|---|---|---|---|---|---|---|
| Sc | Al | Fe | Ni | Mg | Cr | Mn | Ti | Ca | U | Co | Th | Cu | V | Zr | Zn |
| 7.4 | — | — | — | — | — | — | — | — | 97.9 | — | 92.9 | — | — | — | — |

TABLE 5

Recovery rate of various kinds of elements contained in washing liquid [%]

| Sc | Al | Fe | Ni | Mg | Cr | Mn | Ti | Ca | U | Co | Th | Cu | V | Zr | Zn |
|---|---|---|---|---|---|---|---|---|---|---|---|---|---|---|---|
| 9.2 | — | — | — | — | — | — | — | — | 8.8 | — | 38.6 | — | — | — | — |

By washing the extraction organic phase three times in this way, a slight amount of scandium extracted into the organic solvent was able to be separated into the aqueous phase and the scandium concentration in the organic solvent was able to be decreased to a level of less than 10 mg/l.
(Backward Extraction Step S63)

Next, pure water was mixed with the extraction organic phase after washing so as to have a phase ratio O/A of 1/0.3, the mixture was stirred for 20 minutes, allowed to still stand, and separated into an organic phase (organic solvent) after the backward extraction and an aqueous phase (post-backward extraction liquid).
[Scandium Recovering Step S7]
(Oxalate-Formation Step S71)

Next, crystals of oxalic acid·dihydrate (manufactured by MITSUBISHI GAS CHEMICAL COMPANY, INC.) were added to and dissolved in the post-extraction liquid (raffinate liquid) obtained through the solvent extraction step S6 described above so as to be 2 times the amount of scandium contained in the raffinate liquid as a calculated amount, and the solution was stirred and mixed for 60 minutes to generate a white crystalline precipitate of scandium oxalate.
(Roasting Step S72)

Next, the precipitate of scandium oxalate thus obtained was suction filtered, washed with pure water, and then dried at 105° C. for 8 hours. Subsequently, the scandium oxalate after drying was placed in a tubular furnace and maintained at 850° C. to 900° C. for a roasting (calcination) treatment, thereby obtaining scandium oxide.

Scandium oxide thus obtained was analyzed by emission spectral analysis, and the decreasing rate of thorium (Th) as an impurity in scandium oxide recovered through the solvent extraction treatment described above was examined. Note that the decreasing rate of thorium was calculated based on the amount of thorium in scandium oxide obtained by subjecting the scandium eluate obtained through the ion exchange step S4 to the treatment in the dissolution step S5 to obtain a scandium-dissolved nitric acid liquid and then subjecting the scandium-dissolved nitric acid liquid to a roasting treatment but not subjecting this to the solvent extraction treatment described above. The grade and calculation result on the decreasing rate of thorium in scandium oxide are shown in the following Table 6.

TABLE 6

|  | Without solvent extraction treatment using TBP | With solvent extraction treatment using TBP (Example) |
|---|---|---|
| Th grade (in terms of oxide) [mg] | 3900 | 70 |
| Th decreasing rate |  | 98% |

As can be seen from the results shown in Table 6, it was possible to almost completely remove thorium of an impurity and to recover scandium as scandium oxide ($Sc_2O_3$) having a significantly high purity through the scandium recovering process described above.

Example 2

In the same manner as in Example 1, nickel oxide ore was leached with sulfuric acid, the post-sulfuration liquid obtained was allowed to pass through a chelating resin, and sodium hydroxide was added to the scandium eluate eluted from the chelating resin and a hydroxide precipitate of scandium was obtained.

Moreover, in Example 2, the hydroxide precipitate of scandium thus obtained was dissolved by adding hydrochloric acid and sodium chloride thereto, thereby obtaining a hydrochloric acid acidic solution (scandium-dissolved hydrochloric acid liquid). Some components were added to this hydrochloric acid acidic solution in the form of reagents, thereby preparing extraction starting liquids each having the compositions shown in the following Table 7, and these were used as starting liquids A to H.

TABLE 7

| | Composition of extraction starting liquid (scandium-dissolved hydrochloric acid liquid) | | | | | | | ORP |
|---|---|---|---|---|---|---|---|---|
| No | Sc | Al | Fe | Na | Th | U | pH | [mV] |
| A | 0.93 | 1.4 | 0.71 | 22 | 4.5 | 15 | 2.2 | 659 |
| B | 0.93 | 1.4 | 0.71 | 22 | 4.5 | 15 | 2.2 | 659 |
| C | 1.60 | 2.3 | 1.60 | 21 | 7.8 | 24 | 1.8 | 675 |
| D | 1.60 | 2.3 | 1.60 | 21 | 7.8 | 24 | 1.8 | 689 |
| E | 0.91 | 1.4 | 0.69 | 45 | 4.4 | 15 | 2.1 | 658 |
| F | 0.91 | 1.4 | 0.69 | 45 | 4.4 | 15 | 2.1 | 658 |
| G | 1.60 | 2.4 | 1.70 | 46 | 8.1 | 25 | 1.7 | 671 |
| H | 1.60 | 2.4 | 1.70 | 46 | 8.1 | 25 | 1.7 | 680 |

※The unit is "g/l", and the unit is "mg/l" for Th and U.
※An Ag—AgCl electrode was used as a reference electrode for the measurement of oxidation-reduction potential (ORP) [mV].

Next, each of the extraction starting liquids having the compositions shown in E to H of Table 7 was sampled by 21 ml, this was mixed with 7 ml of an organic solvent containing TBP of a neutral extractant at 1 vol %, and the mixture was placed in a beaker and stirred at room temperature for 15 minutes to perform an extraction treatment. After the stirring was completed, the mixture was allowed to still stand and separated into a post-extraction organic solvent (extractant) and a raffinate liquid by using a separatory funnel, and each of these was analyzed by ICP.

Here, the chloride concentration (T-Cl) at the time of extraction was calculated from the respective analytical values of scandium, aluminum, iron, uranium and thorium, the total amount of Cl calculated from the forms considered to be present in the hydrochloric acid acidic solution, and the amount of Cl contained in hydrochloric acid and sodium chloride added at the time of adjustment.

The composition of the raffinate liquid obtained by the solvent extraction treatment of the hydrochloric acid acidic solution is shown in the following Table 8. Note that the chloride concentration (T-Cl) at the time of extraction is also shown in Table 8 as the concentration (mol/l) in the raffinate liquid.

TABLE 8

| | Composition of raffinate liquid | | | | | | T-Cl [mol/l] | pH | ORP [mV] |
|---|---|---|---|---|---|---|---|---|---|
| | Sc | Al | Fe | Na | Th | U | | | |
| Example 2-1 (Starting liquid E) | 0.90 | 1.4 | 0.34 | 44 | 4.0 | 7 | 2.16 | 2.4 | 634 |
| Example 2-2 (Starting liquid F) | 0.88 | 1.4 | 0.34 | 44 | 4.0 | 7 | 2.16 | 2.2 | 632 |
| Example 2-3 (Starting liquid G) | 1.70 | 2.4 | 0.85 | 48 | 8.6 | 7 | 2.57 | 1.9 | 638 |
| Example 2-4 (Starting liquid H) | 1.50 | 2.4 | 0.80 | 44 | 7.5 | 6 | 2.37 | 1.9 | 655 |

※The unit is "g/l", and the unit is "mg/l" for Th and U.
※An Ag—AgCl electrode was used as a reference electrode for the measurement of oxidation-reduction potential (ORP) [mV].

As shown in Table 8, it was confirmed that uranium was effectively extracted by solvent extraction using the hydrochloric acid acidic solutions (extraction starting liquids) E to H, which were the present Example 2.

In addition, the percentages of the proportions (amount in organic solvent/amount in extraction starting liquid) obtained by dividing the amounts of scandium, uranium and thorium in the organic solvent described above by the respective amounts thereof in the extraction starting liquid were calculated, and these are shown in the following Table 9 and FIG. 2 as the extraction rate (%). Note that FIG. 2 is a graph for illustrating the relationship between the chloride concentration and the extraction rates of the respective elements.

TABLE 9

| | Extraction rate [%] | | |
|---|---|---|---|
| | Sc | Th | U |
| Example 2-1 (Starting liquid E) | 2.2 | 9.2 | 62.1 |
| Example 2-2 (Starting liquid F) | 2.2 | 9.2 | 62.1 |
| Example 2-3 (Starting liquid G) | 2.5 | 5.0 | 92.3 |
| Example 2-4 (Starting liquid H) | 2.6 | 4.7 | 93.0 |

Figure 2:
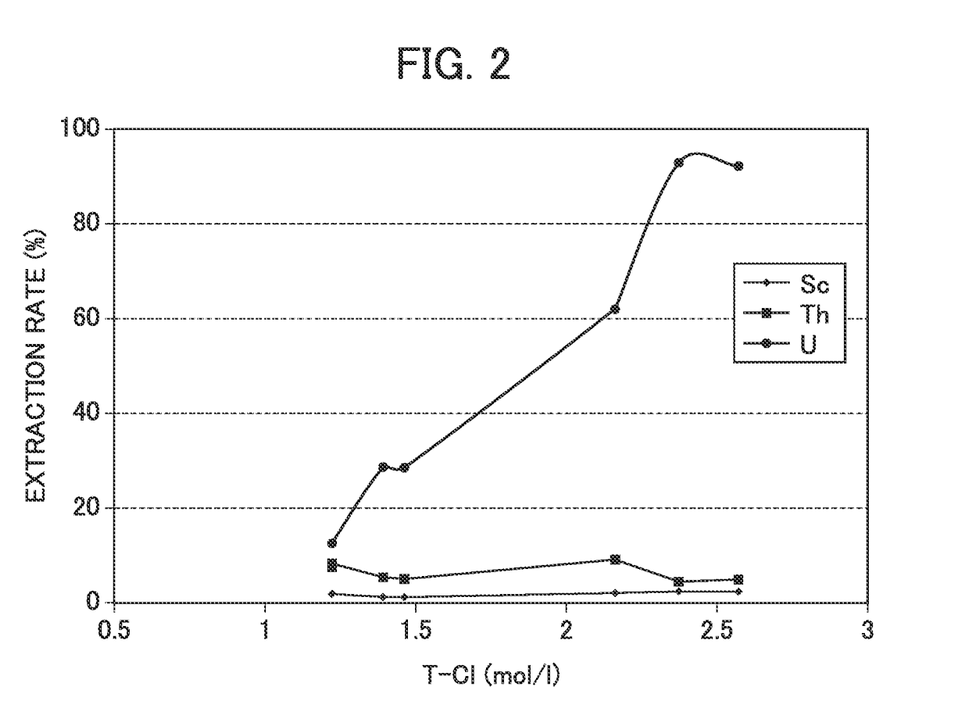
FIG. 2 is a graph for illustrating the relationship between the chloride concentration at the time of extraction and the extraction rates of scandium (Sc), uranium (U) and thorium (Th).

As shown in Table 9 and FIG. 2, the extraction rate of uranium was 62.1% at T-Cl (chloride concentration) of 2.16 mol/l in the hydrochloric acid acidic solution and the extraction rate of uranium reached 92% or more at T-Cl of 2.37 mol/l. In addition, in the extraction treatment of these, it has been confirmed that it is possible to suppress the extraction rate of scandium to 3% or less and to effectively separate uranium and scandium from each other by a solvent extraction treatment.

Subsequently, sodium hydroxide as a neutralizing agent was added to the raffinate liquid (Example 2-4) obtained by subjecting the starting liquid H having the composition shown in Table 8 to a solvent extraction treatment, and a precipitate containing scandium (scandium hydroxide) was generated. Next, this precipitate was completely dissolved by adding a hydrochloric acid solution thereto, thereby obtaining a dissolved liquid (scandium-dissolved liquid) having the composition shown in the following Table 10.

TABLE 10

| | Composition of Scandium-dissolved liquid | | | | | |
|---|---|---|---|---|---|---|
| | Sc | Al | Fe | Na | Th | U |
| Example 2-4 (Starting liquid H) | 10 | 16 | 9.3 | 147 | 57 | 133 |

※The unit is "g/l", and the unit is "mg/l" for Th and U.

Next, crystals of oxalic acid•dihydrate (manufactured by MITSUBISHI GAS CHEMICAL COMPANY, INC.) were added to and dissolved in the scandium-dissolved liquid which was dissolved with hydrochloric acid and shown in Table 10 in an amount to be 1.5 equivalent amounts with respect to the amount of scandium contained in the dissolved liquid as a calculated amount, and the solution was stirred and mixed at room temperature for 60 minutes to conduct a reaction, thereby generating a white crystalline precipitate of scandium oxalate.

The precipitate of scandium oxalate thus obtained was taken out by solid-liquid separation, and the contents of thorium and uranium in the precipitate were analyzed. The analytical values thereof are shown in the following Table 11.

TABLE 11

| | Analytical value of Sc oxalate [ppm] | | |
|---|---|---|---|
| | Th | U | Remarks |
| Example 2-4 (Starting liquid H) | 70 | 10 | Solvent extraction + Oxalate formation |

As shown in Table 11, it was possible to generate a precipitate of scandium oxalate in which the content of thorium was 70 ppm and the content of uranium was decreased to a significantly small amount of 10 ppm and thus to effectively separate thorium and uranium from scandium precipitated.

Comparative Example 1

As Comparative Example 1, the extraction starting liquids having the compositions shown in A to D of Table 7 above were subjected to solvent extraction by the same method as in Example 1. Specifically, these extraction starting liquids were mixed with TBP as a neutral extractant under the same conditions as in Example 1, and the mixture was stirred at room temperature for 15 minutes by using a stirrer to perform an extraction treatment. Subsequently, after the stirring was completed, the mixture was allowed to still stand and separated into a post-extraction organic solvent and a raffinate liquid by using a separatory funnel, and each of these was analyzed by ICP.

The composition of the raffinate liquid obtained by the solvent extraction treatment is shown in the following Table 12. Note that the chloride concentration at the time of extraction is also shown in Table 12 as the concentration (mol/l) in the raffinate liquid. In addition, the extraction rate calculated in the same manner as in Example 1 is shown in Table 13 and FIG. 2. Note that FIG. 2 is a graph for illustrating the relationship between the chloride concentration and the extraction rates of the respective elements as described above.

TABLE 12

| | Composition of raffinate liquid | | | | | | T-Cl [mol/l] | pH | ORP [mV] |
|---|---|---|---|---|---|---|---|---|---|
| | Sc | Al | Fe | Na | Th | U | | | |
| Comparative Example 1-1 (Starting liquid A) | 0.92 | 1.4 | 0.60 | 22 | 4.0 | 13 | 1.22 | 2.2 | 646 |
| Comparative Example 1-2 (Starting liquid B) | 0.91 | 1.4 | 0.59 | 22 | 4.0 | 13 | 1.22 | 2.2 | 646 |
| Comparative Example 1-3 (Starting liquid C) | 1.60 | 2.4 | 1.4 | 22 | 8.5 | 20 | 1.46 | 1.9 | 658 |
| Comparative Example 1-4 (Starting liquid D) | 1.50 | 2.3 | 1.4 | 21 | 7.8 | 18 | 1.39 | 1.9 | 667 |

※The unit is "g/l", and the unit is "mg/l" for Th and U.
※An Ag—AgCl electrode was used as a reference electrode for the measurement of oxidation-reduction potential (ORP) [mV].

TABLE 13

| | Extraction rate (%) | | |
|---|---|---|---|
| | Sc | Th | U |
| Comparative Example 1-1 (Starting liquid A) | 2.0 | 7.6 | 12.7 |
| Comparative Example 1-2 (Starting liquid B) | 2.0 | 8.5 | 12.7 |
| Comparative Example 1-3 (Starting liquid C) | 1.3 | 5.2 | 28.7 |
| Comparative Example 1-4 (Starting liquid D) | 1.3 | 5.5 | 28.8 |

As shown in Tables 12 and 13 and FIG. 2, the uranium extraction rate decreases to 30% or less when the T-Cl concentration is less than 2.0 mol/l. Note that the uranium extraction rate reaches 60% or more when the T-Cl concentration is 2.0 mol/l and uranium can be extracted at a proportion of 92% or more and effectively separated from scandium when the T-Cl concentration exceeds 2.5 mol/l.

Thorium in the hydrochloric acid acidic solution cannot be separated as much as uranium by the solvent extraction treatment, but thorium can be effectively separated from scandium by concurrently performing the oxalate-formation treatment of the raffinate liquid and thus precipitating scandium.

Comparative Example 2

As Comparative Example 2, a hydrochloric acid acidic solution having the same composition as the starting liquid H, which had the composition shown in Table 7 above and was used in Example 2, was used and the hydrochloric acid acidic solution was not subjected to a solvent extraction treatment but subjected to an oxalate-formation treatment by directly adding oxalic acid thereto. The conditions for oxalate-formation treatment were set to be the same as those in Example 1.

The analytical values of scandium oxalate obtained by the oxalate-formation treatment are shown in the following Table 14. Note that the analytical values of scandium oxalate obtained by the oxalate-formation treatment in Example 2 shown in Table 11 and the analytical values of scandium oxalate when the raffinate liquid after the solvent extraction in Comparative Example 1 (Comparative Examples 1-3) was subjected to the oxalate-formation treatment under the same conditions as in Example 2 are also shown in Table 14.

TABLE 14

| | Analytical value of Sc oxalate [ppm] | | Remarks |
|---|---|---|---|
| | Th | U | |
| Example 2-4 (H) | 70 | 10 | Example 2: Solvent extraction + Oxalate formation |
| Comparative Example 1-3 (C) | 70 | 50 | Comparative Example 1: Solvent extraction + Oxalate formation |
| Comparative Example 2 | 80 | 60 | Comparative Example 2: Oxalate formation (Without solvent extraction) |

As shown in Table 14, in Comparative Example 2, the uranium grade in scandium oxalate obtained was 60 ppm, and as a result, a larger amount of uranium was contained in scandium oxalate as compared with that in Example 1 in a case in which the hydrochloric acid acidic solution containing scandium, uranium and thorium was not subjected to the solvent extraction treatment but directly subjected to the oxalate-formation treatment. Note that the uranium grade was 50 ppm in a case in which the raffinate liquid after the solvent extraction obtained in Comparative Example 1 was subjected to the oxalate-formation treatment as well.

Comparative Example 3

As Comparative Example 3, a hydrochloric acid acidic solution having the same composition as the starting liquid H, which had the composition shown in Table 7 described above and was used in Example 2, was used and the hydrochloric acid acidic solution was not subjected to a solvent extraction treatment, but a precipitate of a hydroxide containing scandium (scandium hydroxide) was generated by directly adding sodium hydroxide to the hydrochloric acid acidic solution. Thereafter, scandium hydroxide thus obtained was also not subjected to an oxalate-formation treatment but subjected to analysis as it was. The analytical values of scandium hydroxide are shown in the following Table 15.

TABLE 15

| | Analytical value of Sc oxalate [ppm] | | Remarks |
|---|---|---|---|
| | Th | U | |
| Comparative Example 3 | 1000 | 450 | Comparative Example 3: Without solvent extraction, without oxalate formation |

As shown in Table 15, in Comparative Example 3, the thorium grade in scandium hydroxide was 1000 ppm. As is also apparent when being compared with the analytical values of scandium oxalate after oxalate-formation obtained in Example 2, both the thorium grade and the uranium grade increased and it was not possible to efficiently separate thorium and uranium from scandium and to effectively purify scandium as the solvent extraction treatment and the oxalate-formation treatment were not performed.

Comparative Example 4

As Comparative Example 4, a solvent extraction treatment was performed under the same conditions as in Example 2 using a hydrochloric acid acidic solution having the same composition as the starting liquid H, which had the composition shown in Table 7 above and was used in Example 2, and then a precipitate of a hydroxide containing scandium (scandium hydroxide) was generated by adding sodium hydroxide to the raffinate liquid thus obtained. Thereafter, scandium hydroxide thus obtained was not subjected to an oxalate-formation treatment but subjected to analysis as it was. The analytical values of scandium hydroxide are shown in the following Table 16.

TABLE 16

| | Analytical value of Sc oxalate [ppm] | | |
|---|---|---|---|
| | Th | U | Remarks |
| Comparative Example 4 | 950 | 30 | Comparative Example 4: With solvent extraction, without oxalate formation |

As shown in Table 16, in Comparative Example 4, the thorium grade in scandium hydroxide was 950 ppm. With regard to uranium, it was possible to decrease the grade to 30 ppm by performing the solvent extraction treatment, but it has been found that thorium cannot be effectively decreased only by the solvent extraction treatment and the oxalate-formation treatment is required for separation of thorium.

From the facts described above, it has been found that it is possible to effectively separate scandium from uranium and thorium and to obtain scandium having a low uranium grade and a low thorium grade by subjecting an acidic solution containing scandium, uranium, and thorium to solvent extraction using a neutral extractant and further subjecting the raffinate liquid obtained thereafter to an oxalate-formation treatment.

The invention claimed is:

1. A method for recovering scandium comprising:
   a leaching step of leaching nickel oxide ore containing scandium and an actinoid element with sulfuric acid at high temperature and high pressure to obtain a leachate and a leach residue;
   a neutralization step of adding a neutralizing agent to the leachate to obtain a neutralized precipitate and a post-neutralization liquid;
   a sulfuration step of adding a sulfurizing agent to the post-neutralization liquid to obtain nickel sulfide and a post-sulfuration liquid;
   an ion exchange step of bringing the post-sulfuration liquid into contact with a chelating resin to adsorb scandium in the post-sulfuration liquid to the chelating resin and thus to obtain a scandium eluate;
   a dissolution step of adding an alkali to the scandium eluate to obtain a precipitate of scandium hydroxide, then adding an acid solution to the scandium hydroxide, and performing acid dissolution to obtain a scandium-dissolved acid liquid;
   a solvent extraction step of maintaining a pH of the scandium-dissolved acid liquid in a range of between 1.0 or more and 2.5 or less and bringing the scandium-dissolved acid liquid into contact with a neutral extractant containing phosphorus to extract and separate impurity elements other than scandium and to obtain a raffinate liquid containing scandium; and
   a scandium recovering step of adding oxalic acid to the raffinate liquid to generate a salt of scandium oxalate and roasting the salt of scandium oxalate to obtain scandium oxide.

2. The method for recovering scandium according to claim 1, wherein the chelating resin is a resin containing iminodiacetic acid as a functional group, and the ion exchange step includes:
   an adsorption step of bringing the post-sulfuration liquid into contact with the chelating resin to adsorb the scandium to the chelating resin;
   an aluminum removing step of bringing a sulfuric acid solution at 0.1 N or less into contact with the scandium-adsorbed chelating resin in the adsorption step to remove aluminum adsorbed to the chelating resin in the adsorption step;
   a scandium elution step of bringing a sulfuric acid solution at 0.3 N or more and less than 3 N into contact with the chelating resin subjected to the aluminum removing step to obtain the scandium eluate; and
   a chromium removing step of bringing a sulfuric acid solution at 3 N or more into contact with the chelating resin subjected to the scandium elution step to remove chromium adsorbed to the chelating resin in the adsorption step.

3. The method for recovering scandium according to claim 1, wherein
   the solvent extraction step includes:
   an extraction step of mixing the scandium-dissolved acid liquid with an organic solvent containing the neutral extractant and separating the mixture into a post-extraction organic solvent extracted impurity elements other than scandium and a raffinate liquid;
   a scrubbing step of mixing the post-extraction organic solvent with an acid solution having a concentration of 1.0 mol/l or more and 5.0 mol/l or less and recovering scandium from the post-extraction organic solvent to obtain a post-washing organic solvent; and
   a backward extraction step of adding a backward extractant to the post-washing organic solvent and backward extracting impurity elements from the post-washing organic solvent to obtain a backward extraction liquid.

4. The method for recovering scandium according claim 1, wherein a scandium-dissolved nitric acid liquid of a scandium-dissolved acid liquid is obtained by adding a nitric acid solution to the scandium hydroxide and performing acid dissolution in the dissolution step.

5. The method for recovering scandium according to claim 1, wherein a scandium-dissolved hydrochloric acid liquid of a scandium-dissolved acid liquid is obtained by adding a hydrochloric acid solution to the scandium hydroxide and performing acid dissolution in the dissolution step.

6. The method for recovering scandium according to claim 5, wherein in the solvent extraction step,
   a chloride concentration in the scandium-dissolved hydrochloric acid liquid obtained in the dissolution step is adjusted to 2.0 mol/l or more and 6.0 mol/l or less and the scandium-dissolved hydrochloric acid liquid is brought into contact with the neutral extractant.

7. The method for recovering scandium according to claim 1, wherein the scandium recovering step includes:

a step of adding sodium hydroxide having a concentration of 5.0 mol/l or more and 8.0 mol/l or less to the raffinate liquid obtained in the solvent extraction step to obtain a precipitate of scandium hydroxide;

a step of dissolving the precipitate of scandium hydroxide obtained with sulfuric acid or hydrochloric acid and adding oxalic acid to the dissolved liquid obtained through the dissolution to obtain a crystal of scandium oxalate; and a step of calcining the crystal of scandium oxalate.

8. The method for recovering scandium according to claim 2, wherein the solvent extraction step includes:

an extraction step of mixing the scandium-dissolved acid liquid with an organic solvent containing the neutral extractant and separating the mixture into a post-extraction organic solvent extracted impurity elements other than scandium and a raffinate liquid;

a scrubbing step of mixing the post-extraction organic solvent with an acid solution having a concentration of 1.0 mol/l or more and 5.0 mol/l or less and recovering scandium from the post-extraction organic solvent to obtain a post-washing organic solvent; and a backward extraction step of adding a backward extractant to the post-washing organic solvent and backward extracting impurity elements from the post-washing organic solvent to obtain a backward extraction liquid.

9. The method for recovering scandium according claim 2, wherein a scandium-dissolved nitric acid liquid of a scandium-dissolved acid liquid is obtained by adding a nitric acid solution to the scandium hydroxide and performing acid dissolution in the dissolution step.

10. The method for recovering scandium according claim 3, wherein a scandium-dissolved nitric acid liquid of a scandium-dissolved acid liquid is obtained by adding a nitric acid solution to the scandium hydroxide and performing acid dissolution in the dissolution step.

11. The method for recovering scandium according to claim 2, wherein a scandium-dissolved hydrochloric acid liquid of a scandium-dissolved acid liquid is obtained by adding a hydrochloric acid solution to the scandium hydroxide and performing acid dissolution in the dissolution step.

12. The method for recovering scandium according to claim 3, wherein a scandium-dissolved hydrochloric acid liquid of a scandium-dissolved acid liquid is obtained by adding a hydrochloric acid solution to the scandium hydroxide and performing acid dissolution in the dissolution step.

13. The method for recovering scandium according to claim 2, wherein the scandium recovering step includes:

a step of adding sodium hydroxide having a concentration of 5.0 mol/l or more and 8.0 mol/l or less to the raffinate liquid obtained in the solvent extraction step to obtain a precipitate of scandium hydroxide;

a step of dissolving the precipitate of scandium hydroxide obtained with sulfuric acid or hydrochloric acid and adding oxalic acid to the dissolved liquid obtained through the dissolution to obtain a crystal of scandium oxalate; and a step of calcining the crystal of scandium oxalate.

14. The method for recovering scandium according to claim 3, wherein the scandium recovering step includes:

a step of adding sodium hydroxide having a concentration of 5.0 mol/l or more and 8.0 mol/l or less to the raffinate liquid obtained in the solvent extraction step to obtain a precipitate of scandium hydroxide;

a step of dissolving the precipitate of scandium hydroxide obtained with sulfuric acid or hydrochloric acid and adding oxalic acid to the dissolved liquid obtained through the dissolution to obtain a crystal of scandium oxalate; and a step of calcining the crystal of scandium oxalate.

15. The method for recovering scandium according to claim 1, wherein the actinoid element is uranium and thorium.

* * * * *